Aug. 14, 1934.   P. LANDROCK   1,970,381
PHOTOGRAPHIC COPY HOLDING APPARATUS
Filed Sept. 8, 1932   4 Sheets-Sheet 4
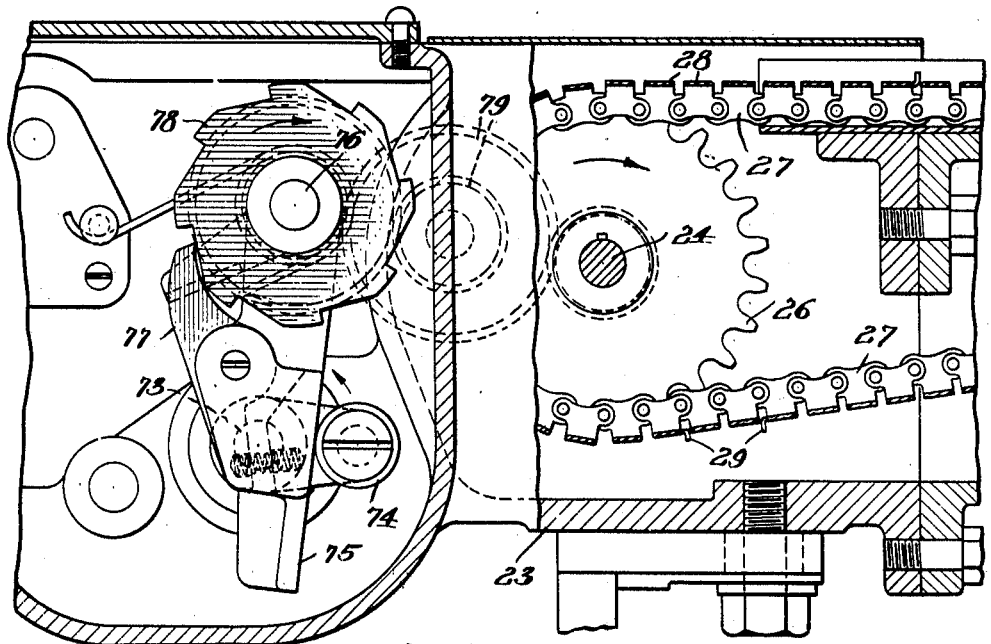
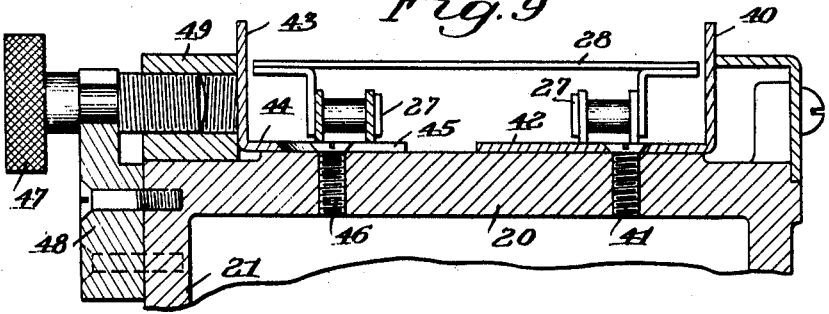
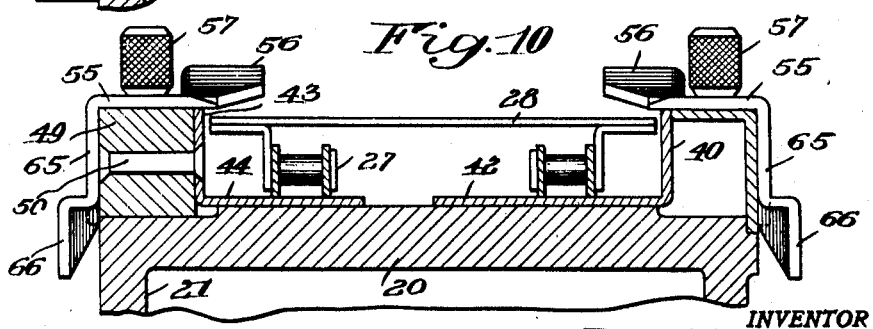
INVENTOR
Paul Landrock
BY Edward H Cumpston
his ATTORNEY Patented Aug. 14, 1934

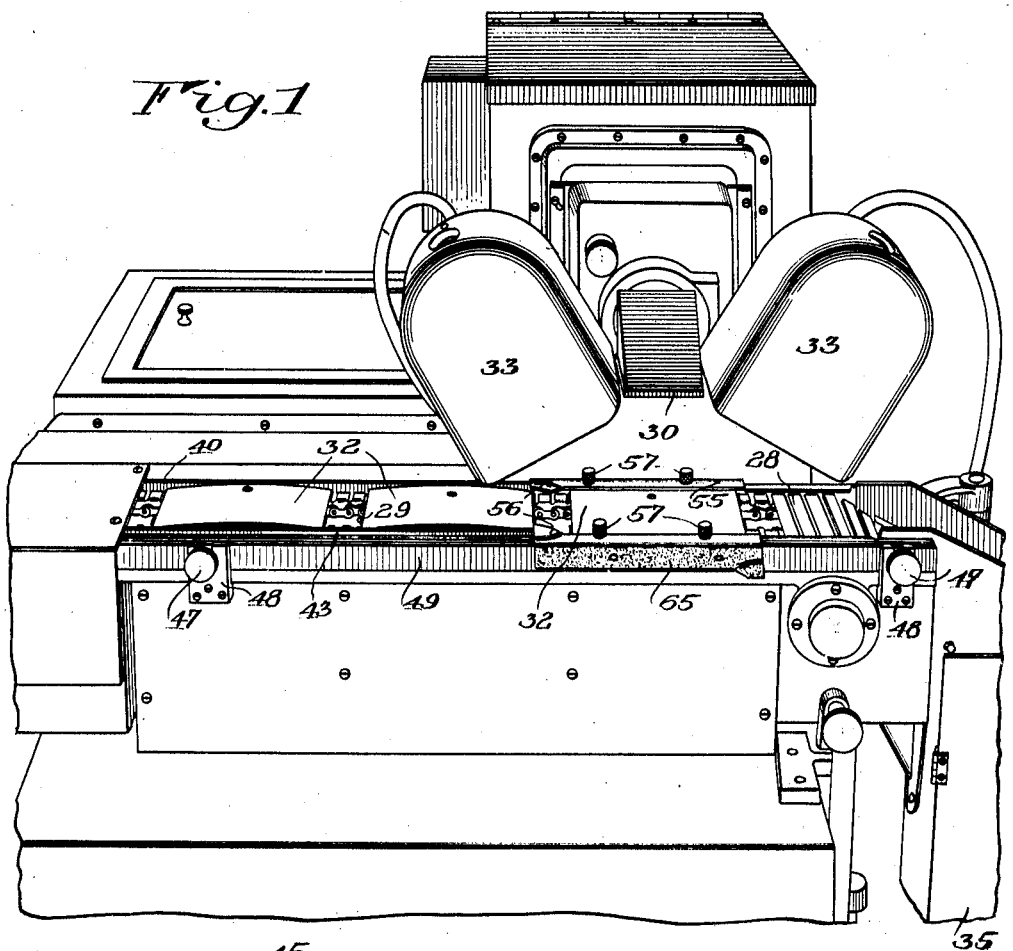//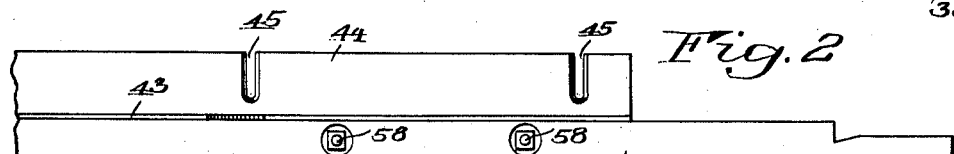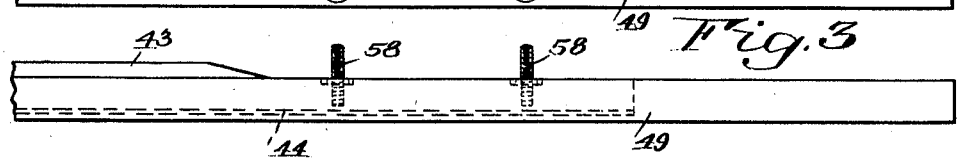

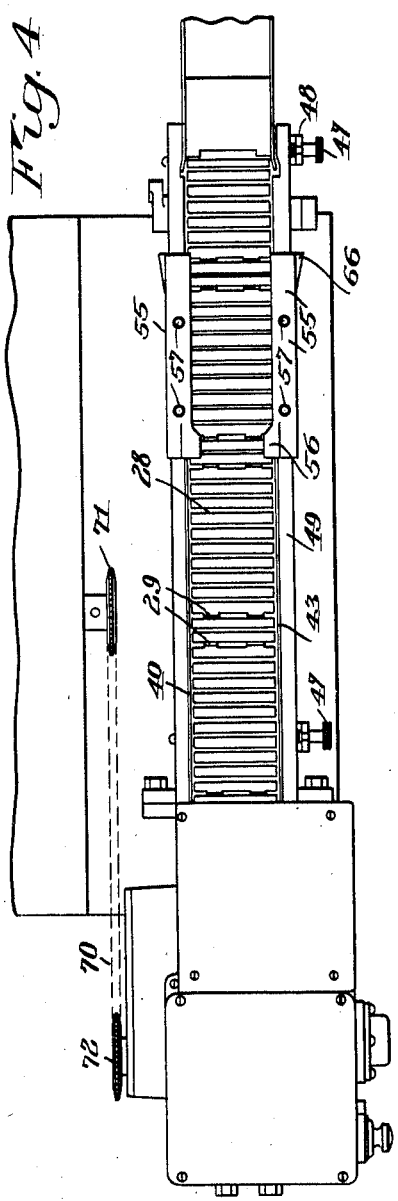
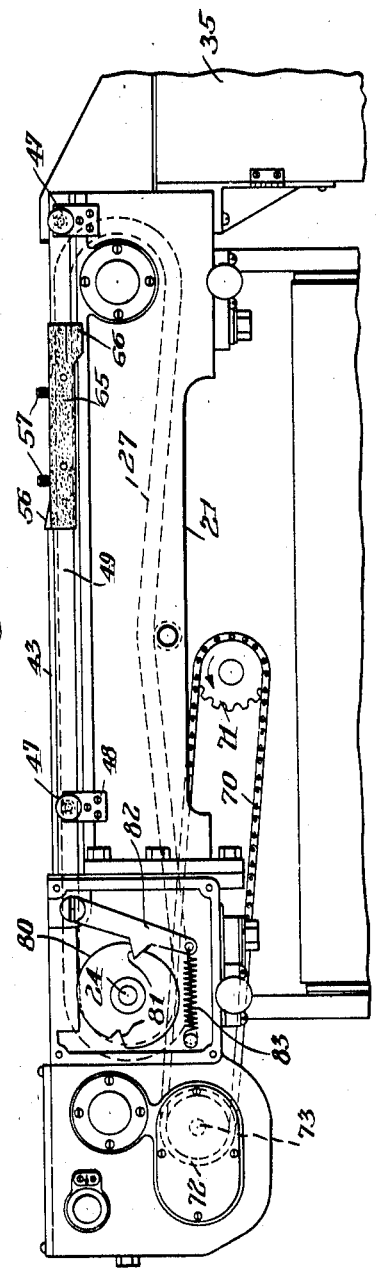

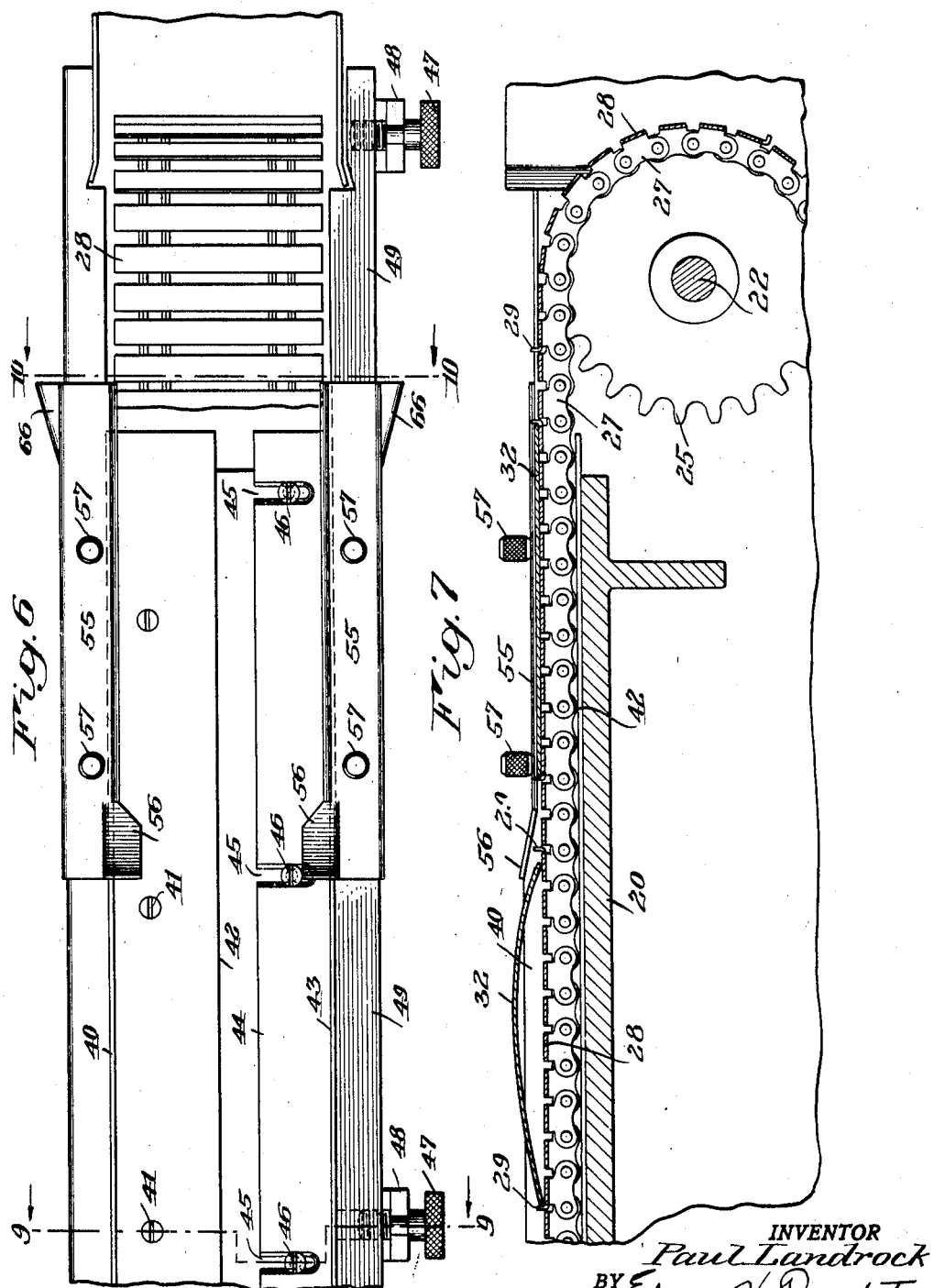

1,970,381

UNITED STATES PATENT OFFICE 1,970,381

PHOTOGRAPHIC COPY HOLDING APPARATUS

Paul Landrock, Rochester, N. Y., assignor to Photostat Corporation, Providence, R. I., a corporation of Rhode Island Application September 8, 1932, Serial No. 632,173

7 Claims. (Cl. 88—24)

This invention relates to photographic copy holding apparatus, and especially to that type of apparatus in which conveying means is provided for moving pieces of copy to and from the photographic field of a camera. An object of the invention is the provision of simplified and more satisfactory apparatus of this kind, constructed of few parts, comparatively inexpensive to manufacture, and efficient in operation.

Another object of the invention is the provision of apparatus especially designed for holding the copy to be photographed in flat position, even if the copy has a tendency to curl or otherwise to become displaced.

Still another object of the invention is the provision of apparatus designed for efficient and satisfactory use in connection with copy of more than one color, and particularly of apparatus having holding or guiding parts of different colors for use with copy of corresponding different colors so that any parts of the apparatus which show in a photograph of the copy will be of substantially the same color as the background of the copy.

A further object is the provision of simple reversible guides having different colors on different parts so that the guides may be applied to other parts of the apparatus in one position for use in making photographs of copy having one color, and in another position for making photographs of copy having another color.

A still further object is the provision of copy holding and conveying apparatus especially suitable for the efficient and satisfactory handling of a quantity of cards of substantially the same size.

To these and other ends the invention resides in certain improvements and combinations of parts, all as will be hereinafter more fully described, the novel features being pointed out in the claims at the end of the specification.

In the drawings:

Fig. 1 is a perspective view of copy holding means constructed in accordance with a preferred embodiment of the present invention, applied to a camera in connection with which it is used;

Fig. 2 is a plan of a portion of an adjustable side guide used in the apparatus;

Fig. 3 is an elevation of the parts shown in Fig. 2;

Fig. 4 is a plan of the holding and conveying apparatus;

Fig. 5 is a side view of the parts shown in Fig. 4;

Fig. 6 is a plan on a larger scale of a fragment of the copy holding and conveying apparatus, with parts broken away, illustrating particularly the guides for holding the copy flat;

Fig. 7 is a vertical section taken longitudinally substantially along the center of Fig. 6;

Fig. 8 is a longitudinal vertical section forming substantially a leftward continuation of Fig. 7, illustrating certain driving mechanism for the copy conveyor;

Fig. 9 is a transverse section taken substantially on the line 9—9 of Fig. 6, and Fig. 10 is a transverse section taken substantially on the line 10—10 of Fig. 6.

The same reference numerals throughout the several views indicate the same parts.

The copy holding and conveying apparatus of the present invention, while capable of many uses, is here shown by way of illustration in an embodiment especially adapted for copy consisting of cards such as are used by libraries, insurance companies, and the like, as catalogue or index cards. It is also shown by way of example as applied to a camera designed particularly for photographing such cards. In the first photographing operation, ordinarily the card has a white or light colored background and the printing or writing thereon is in black or dark colored ink. If the photograph is made from such a card directly onto sensitized paper or the like, the resulting photograph when developed and fixed will be a "negative" in which the colors of the original card will be reversed; that is, if the original card had a white background, the negative will have a substantially black background and the writing or printing will appear in white.

Then if additional copies are needed, the negative may be placed in the photographic field of the camera, and one or more exposures may be made of each negative, to produce "positive" prints in which the colors of the negative are reversed, so that the positive prints, like the original cards which they reproduce, have a substantially white background with writing or printing thereon in black.

The camera used for making the photographs may be constructed, for example, in substantially the manner disclosed in the co-pending patent application of Arthur W. Caps and Paul Landrock, filed December 21, 1931, Serial No. 582,361, for Camera. Many of the features of the copy holding and conveying apparatus may also be as shown in the aforesaid application, but other features, which constitute the present invention, are an improvement over the apparatus disclosed in the aforesaid application.

The copy holding and conveying apparatus preferably comprises a frame member 20 forming a bed plate with depending side flanges 21 for strengthening it. The frame has suitable bearings for a shaft 22 (Fig. 7) near its right hand end. A casing 23 (Fig. 8) secured to the left hand end of the frame 20 and forming a leftward extension thereof, also has suitable bearings for a shaft 24. The shafts 22 and 24 respectively carry sprockets 25 and 26 over which passes suitable conveying means preferably of endless form. This conveying means may comprise chain links 27 forming two parallel and laterally spaced chains, and cross members 28 extending laterally from one chain to the other, these cross members forming a series of slats relatively close to each other which constitute a substantially flat bed for holding a piece of copy to be photographed, such as a catalogue card or a negative print thereof, as above described.

At intervals, the cross members or slats 28 are provided with upstanding projections or lugs 29 somewhat inwardly from the side edges of the conveyor and spaced the right distance from each other longitudinally of the conveyor so that they will accommodate between them a piece of copy of the size intended to be used with the apparatus. Thus the copy is embraced by the lugs and held thereby against longitudinal slippage along the conveyor.

The camera for photographing the objects held on the conveyor is mounted in suitable position such as disclosed in the aforesaid patent application. The camera may have, for example, a prism 30 directly over a point on the conveyor near the right hand end thereof, as shown in Fig. 1 of the present drawings. Pieces of copy, such as the cards 32, illustrated in Figs. 1 and 7, may be placed in proper position with respect to the lugs or projections 29 near the left hand end of the conveyor, and rightward movement of the conveyor by clockwise rotation of the sprockets 25 and 26 will result in moving the copy thus placed to a point directly beneath the prism 30, where the copy is in the photographic field of the camera and where it may be illuminated by suitable illuminating means within the casings or reflectors 33, for example.

The conveyor is preferably stopped in position so that each successive piece of copy is properly placed in the photographic field beneath the prism 30. Then, after the exposure or exposures have been made, rightward movement of the conveyor is continued, bringing the next piece of copy into the photographic field and discharging the photographed piece of copy from the right hand end of the conveyor into any suitable receptacle indicated in general by the numeral 35 in Figs. 1 and 5, which receptacle and associated parts may be constructed substantially as disclosed in the aforesaid co-pending patent application.

When cards are being reproduced, it is desirable to have them accurately positioned in the photographic field of the camera, without being cocked or tilted, so that the resulting prints of the cards will likewise be properly placed. To this end, the present apparatus provides lateral edge guides for embracing the cards relatively closely as they move along the conveyor, thus holding them against skewing or tilting. Such edge guides preferably are relatively adjustable toward and away from each other to accommodate the apparatus to cards of slightly varying dimensions.

For example, as shown especially in Fig. 9, a guide 40 may be provided in fixed position along the rear edge of the conveyor, being secured to the base plate 20 in any suitable manner such as by screws 41 passing through the flange 42 fixed to the guide member 40, which flange may also constitute a hard and smooth bearing surface for supporting one of the chains 27.

The front guide, which may be adjustably mounted for movement toward and away from the guide 40, is indicated in Figs. 2, 3, 6, and 9, at 43, and has secured to it a horizontal flange 44 similar to the flange 42 of the guide 40, but provided with slots 45, through which the screws 46 pass to secure the guide to the base plate 20. When the screws 46 are loosened, the guide 43 may be adjusted slightly toward and away from the other lateral guide 40 by suitable means such as the adjusting screws 47 passing through brackets 48 fixed to the frame and threaded into a relatively solid and strong bar 49 securely attached to the guide 43 by means such as rivets 50 (Fig. 10). By turning the adjusting screws 47 in one direction or the other, when the screws 46 are loose, the lateral guide 43 may be adjusted to vary the space between the guides 40 and 43 in order that these guides may closely embrace the particular size of copy being operated upon at that time by the machine. Afterwards, the screws 46 may be tightened to hold the guide in the adjusted position more securely, or, if preferred, the screws 46 may be maintained slightly loose at all times, so that the guide may be readily adjusted at any time simply by moving the adjusting screws 47.

It is found that when the copy to be photographed is formed of card stock, whether of ordinary catalogue cards or of photographic negatives or positives thereof, it has a tendency to curl or warp to some extent, especially if it has been repeatedly handled. This tends to elevate portions of the copy above the copy holding bed provided by the slats 28, so that the elevated portions would be slightly out of focus. In order to prevent this, guide means is provided for holding the cards down flat upon the copy holding bed 28, so that all parts of the card will be properly focused when in the photographic field of the camera.

This means is of the form best shown in Figs. 6, 7, and 10, and comprises a pair of guides mounted on any suitable part of the apparatus for overlying the edges of the copy to be photographed in order to hold these edges down in proper position flat against the bed slats 28. In the preferred form of construction each guide comprises a flange or portion 55 arranged substantially horizontally along one edge of the conveyor and projecting inwardly over one of the lateral guides a sufficient distance to overlie a piece of copy to a slight extent along its edge without covering any substantial part of the piece of copy. The flange or portion 55 is placed so that its bottom surface is spaced above the top surface of the slats 28 by very slightly more than the thickness of a piece of copy. Hence when a piece of copy is engaged under the portion 55, its edge is held down flat on the bed 28.

At the left hand end of the portion 55 of each guide, is an inclined cam portion 56 extending leftwardly and upwardly and inwardly to some extent so that during the rightward movement of the piece of copy on the moving conveyor, the advance edge of the copy even if slightly elevated will surely be caught under and depressed by the cam portion 56.

It is understood that two of these guides are used, one on one side and the other on the other side of the conveyor, as plainly shown in Figs. 1, 6 and 10, for example. Each of the guides overlies the copy only along a comparatively narrow strip at the edge of the copy, sufficient to engage the copy firmly and hold it down on the copy holding bed, but the guides do not overlie or cover any substantial part of the area of the copy. Also, the lugs 29 are spaced sufficiently far inwardly from the edges of the conveyor so that they are out of alinement with the guides 55, 56 and do not interfere therewith even though the lugs preferably project upwardly above the tops of the cards.

Each of the guides is preferably removably held in place by thumb nuts 57 which may be readily screwed on to or off of threaded studs 58 fixed to a suitable part of the apparatus and passing upwardly through suitable holes in the guides in the guide portions 55. The studs 58 at the front edge of the conveyor may be mounted, for example, in the bar 49, as shown in Figs. 2 and 3 of the drawings, so that the associated guide portion 55 will move back and forth with the front edge guide 43 when the latter is adjusted by movement of the adjusting screws 47. The corresponding rear studs may be mounted on any suitable part, such as on the rear lateral guide 40.

Ordinarily, when making photographic reproductions of catalogue or index cards, it is desired to have the reproductions of exactly the same size as the original card. If the camera is focused so as to make full size reproductions, it is apparent that the inner edges of the guides 55, which overlie to a slight extent the edges of the card to be reproduced, will show in the photographic reproduction. Hence it is desired to make these guides as inconspicuous as possible in the photographic reproduction of the copy, and to this end, the guides or at least the portions thereof which overlie the copy are preferably colored the same color as the background of the copy.

As previously explained, the original cards being reproduced usually have a white background, but the negatives made from these cards have a black background. Since it is often desired to make positive prints from the negatives, it follows that the copy placed on the conveyor may at times have a white background (when original cards are being photographed) and at times have a black background (when negatives of original cards are being photographed). The present invention provides guides suitable for use under these varying conditions. To this end, the horizontal portion 55 of each guide has a downwardly extending portion 65 at the outer edge thereof, which may be similar in all respects to the portion 55, and which is provided with an inclined cam portion 66 similar to the cam portion 56, but at the opposite end of the guide. The flange or portion 55, preferably together with the cam portion 56, is painted, enameled, or otherwise formed of one color, such as white, while the portion 65 of each guide, preferably together with the cam portion 66, is colored with another color such as black.

With this arrangement, when original cards or other copy having a substantially white background is being photographed, the guides are placed on the apparatus in the position illustrated in Figs. 1 and 6, with the portions 55 of the guides in effective position and with the portions 65 extending downwardly as shown, at the sides of the conveyor, in an ineffective position where they are substantially out of the way. Hence the inner edges of the portions 55, which overlie the edges of the copy and which are reproduced in the resulting photograph of the copy, are invisible or scarcely noticeable in the resulting photograph since they are of the same color as the copy. When the apparatus is to be used for photographing copy having a substantially black background, such as negative prints of original cards, then the thumb nuts 57 are removed, the guides are taken off of the studs 58, and they are replaced in reverse position with the black flanges 65 extending horizontally in effective position and with white flanges 55 extending downwardly in ineffective position at the sides of the apparatus. The portions of the guides which show in the photographic reproduction are then of substantially the same color as the background of the copy being reproduced, and are invisible or substantially unnoticeable in the reproduction.

The conveyor may be driven in any suitable manner such as by a chain 70 (Figs. 4 and 5) running over the driven sprocket 71 rotated in a counterclockwise direction. The chain 70, for example, may drive the sprocket 72 fixed to a shaft 73 (Figs. 5 and 8) which also has fixed to it a crank 74 effective at each rotation to engage and oscillate an arm 75 loosely mounted on the shaft 76 and having a pawl 77 for engaging a ratchet 78 fixed to the shaft 76. Each complete revolution of the shaft 73 may in this way cause one oscillation of the arm 75 and move the shaft 76 in a clockwise direction through a distance equivalent to one tooth of the ratchet 78.

The clockwise movement of the shaft 76 is transmitted, through suitable gearing 79, to the shaft 24, where it results in clockwise rotation of the shaft to move the conveyor longitudinally so as to carry the individual pieces of copy successively to the photographic field of the camera. The shaft 24 may be provided with a cam disk 80 having two notches 81 at diametrically opposite points for engagement with a detent 82 forced into the notches by the spring 83. The sprockets 26 on the shaft 24 are preferably of such size with relation to the spacing of the copy that a half revolution of the shaft moves the conveyor enough to carry one piece of the copy out of the field of the camera and to place the next succeeding piece of copy in the field. When the detent 82 is in either one of the notches 81 of the disk 80, the lugs 29 which hold the copy are preferably placed so that a piece of copy held by them will be accurately centered in the photographic field.

In use, the pieces of copy to be photographed are successively positioned between the appropriate lugs 29 as they come into accessible position adjacent the left hand end of the conveyor. Then successive movements of the conveyor will carry the pieces of copy successively to the photographic field and stop them in the field long enough to make the desired exposure or exposures. The lateral guides 40 and 43 will confine the copy closely at the sides, keeping it straight on the conveyor and preventing any skewing or twisting. If any piece of copy is bent or warped, it will be flattened out by the cam portions 56 or 66, and the guide portions 55 or 65 will hold the edges of the copy down firmly in position on the conveyor bed, so that the copy will be accurately focused. Then further movement of the conveyor, after the necessary exposures have been made, will discharge the photographed piece of copy into the receptacle 35 and will bring a fresh piece of copy into the photographic field where it is held in place by the guide portions 55 or 65.

When the copy being photographed has a background of one color, the guide portion 55 of corresponding color may be employed, so that the part of the guide which shows in the photographic reproduction will be substantially invisible, and when photographic copy having a background of another color is to be reproduced, the other guide portions 65 may be used, of another color, so that they will be substantially invisible in the reproductions.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Photographic copy conveying apparatus comprising an endless conveying element movable to carry copy to and from a photographic field, means projecting upwardly from said element inwardly of side edges thereof for engaging a piece of copy to hold it in predetermined position on said element, and means overlying the side edges of said element out of alinement with said upwardly projecting means, for holding a piece of copy down substantially flat on said element.

2. Photographic copy conveying apparatus comprising conveying means movable to carry copy to and from a photographic field, lateral guides adjacent opposite side edges of said conveying means to hold a piece of copy in proper transverse position on said conveying means, means for adjusting the position of one of said lateral guides to vary the distance between them, and guiding means mounted on said lateral guides and extending inwardly therefrom to overhang a piece of copy substantially only at the lateral edges thereof to hold said copy substantially flat.

3. Photographic copy conveying apparatus comprising conveying means movable to carry copy to and from a photographic field, lateral guides adjacent opposite side edges of said conveying means to hold a piece of copy in proper transverse position on said conveying means, means for moving one of said guides toward and from the other to vary the distance between them, and opaque means of substantially the same color as the background of said copy mounted on said lateral guides and extending partially into said photographic field, for holding a piece of copy substantially flat when it is in said field.

4. Photographic copy conveying apparatus comprising conveying means movable to carry copy to and from a photographic field, lateral guides adjacent opposite side edges of said conveying means to hold a piece of copy in proper transverse position on said conveying means, means for adjusting the position of said guides relative to each other to vary the distance between them, and means mounted on said lateral guides for overlying a piece of copy to hold it substantially flat when it is in said photographic field.

5. Photographic copy holding apparatus comprising a movable support for moving copy to and from a photographic field, and guiding means including a substantially white portion to be positioned partially within said field overlying a piece of copy with a substantially white background to hold said copy substantially flat in said field and a substantially black portion to be similarly used with a piece of copy having a substantially black background.

6. Photographic copy conveying apparatus comprising a normally stationary member, means movable relative to said member for carrying copy to and from a photographic field, and guiding means mounted on said member, said guiding means comprising a flange of one color for overlying copy having a background of one color to hold said copy substantially flat in said field, and a second flange at an angle thereto and of a different color for overlying copy having a background of another color to hold said copy substantially flat in said field.

7. A guide for holding photographic copy comprising two flanges of different colors and at an angle to each other, said flanges being for selective use in holding copy of different colors, and each flange having an inclined cam portion adjacent one end for guiding copy to a position underlying that flange.

PAUL LANDROCK.